March 14, 1950     J. L. WESTHAVER     2,500,726
LIGHT-WEIGHT OPTICAL LEVER MICROMETER
Filed May 23, 1945
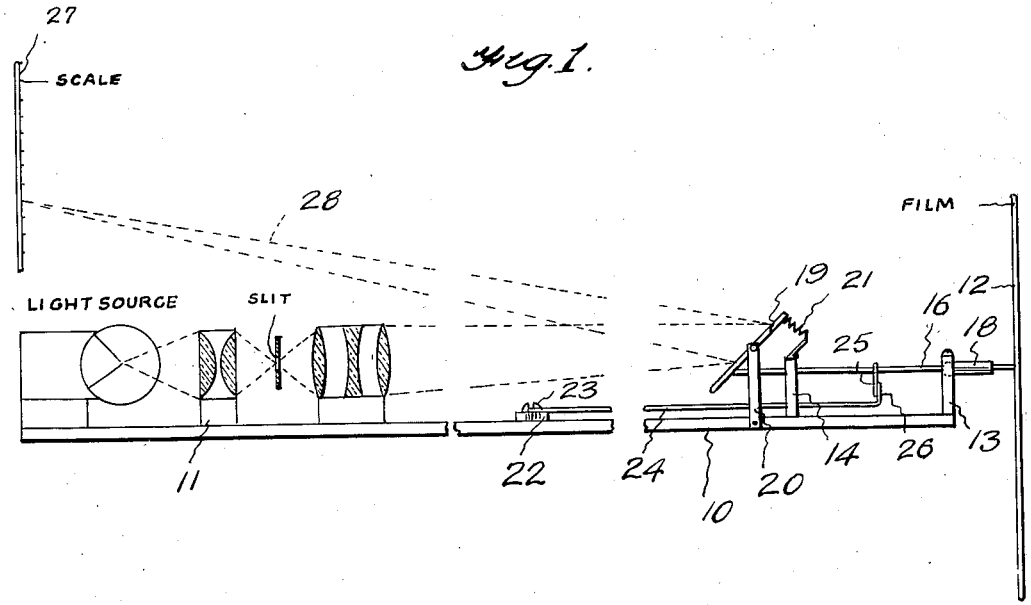
Fig. 1.
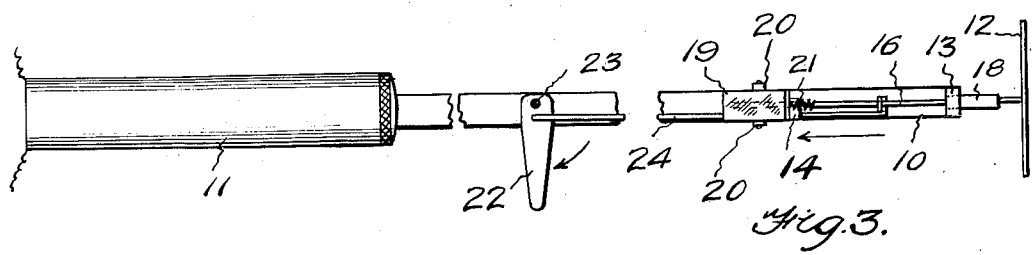
Fig. 2.
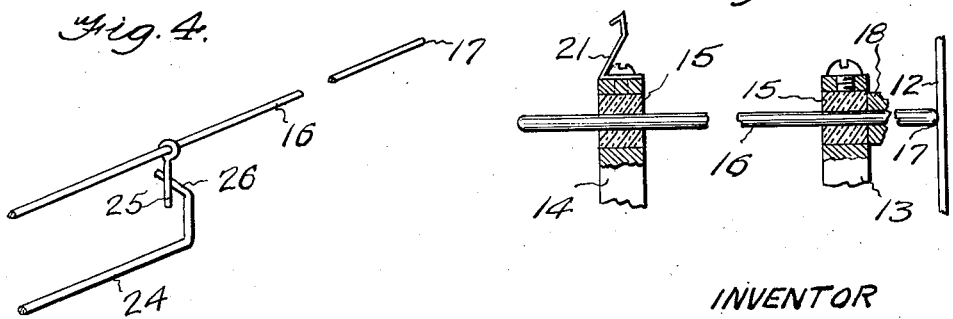
Fig. 3.
Fig. 4.
INVENTOR
JOHN L. WESTHAVER Patented Mar. 14, 1950

2,500,726

UNITED STATES PATENT OFFICE 2,500,726

LIGHT-WEIGHT OPTICAL LEVER MICROMETER

John L. Westhaver, San Diego, Calif.

Application May 23, 1945, Serial No. 595,410

2 Claims. (Cl. 33—172)

This invention relates to an optical lever micrometer and has for one of its objects the production of a simple and efficient light-weight optical lever micrometer which is so constructed as to determine the average film plane of a camera so as to adjust and position the ground glass to obtain the best possible focus of the camera.

A further object of this invention is the production of a simple and efficient means for maintaining an actual very light physical contact with a film, without bending or distorting the film while the position of the light beam which is cast upon the scale from a light source is observed, to obtain an exact measurement and to thereby indicate the amount of displacement of the film plane.

Other objects and advantages of the present invention will appear throughout the following specification and claims.

In the drawing—

Figure 1 is a side elevational view of the device, the light source being indicated in diagram;

Figure 2 is a top plan view;

Figure 3 is an enlarged sectional view illustrating the bearing supports for the film contact wire;

Figure 4 is a fragmentary perspective view of a portion of the film contact wire and retraction means.

By referring to the drawing, it will be seen that 10 designates the long narrow base which carries the light source, condenser and projection lens device 11 at one end thereof. A film 12 is supported vertically and at right angles to the base 10 in any suitable manner beyond one end of the support 10, as shown in Figures 1 and 2. A pair of spaced bearing supports 13 and 14 are carried near the outer end of the base 10 adjacent the film 12 and each bearing support carries a jewel bearing 15 through which jewel bearings 15 slidably extends the film contact wire 16. The outer extremity of the wire 16 is spherical, as shown at 17, where the wire contacts with the film 12. The bearing support 13 carries a safety guard 18 through which the wire 16 extends to provide a means to prevent the wire 16 from bending.

A mirror 19 is pivotally mounted upon the upright arms 20, which are carried by the base 10, and a spring 21 normally retains the mirror in a selected position, approximately at an angle of 45 degrees, as shown. The inner end of the film contact wire 16 frictionally contacts the rear face of the mirror 19 near the lower end of the mirror and opposite to the spring 21.

A retraction lever 22 is pivotally secured to the base 10, as at 23, and a retraction wire 24 is secured to the lever 22 at one end. This retraction wire 24 is guided through the bearing support 14, as shown. The wires 16 and 24 are preferably stiff steel wire which will not readily bend or flex. The wire 16 is provided with a rigid depending finger 25, which is adapted to be engaged by the upwardly and laterally bent finger or extremity of the retraction wire 24 to facilitate the retraction of the end 17 of the wire 16 away from the film 12.

A scale 27 is supported above the rear end of the light source 11 in the manner shown in Figure 1, and this scale is suitably graduated to facilitate the reading of the position of the light ray 28 which is focused and reflected upon the chart or scale 27 from the inclined mirror 19 in the manner also shown in Figure 1. The mirror 19 is swung to change the position of the reflected ray as cast upon the scale 27, as the position of the film contact wire 16 is shifted longitudinally in proportion to the variation of the film 12 which film engages the end 17 of the wire 16.

It should be noted that the mirror 19 is free to swing as the film contacting wire or rod 16 pushes against the lower end of the mirror. The rod or wire 16 has a sliding friction contact with the rear face of the mirror 19. The weight of the mirror normally keeps the lower end of the mirror in contact with the inner end of the wire or rod 16 and the mirror will keep the wire or rod 16 in an extended position or in contact with the film 12 with very slight pressure.

It is a known fact that most types of cameras have proven that although the lens fitted thereto may be of the highest quality, and the image on the ground glass screen is focused to the sharpest degree possible, the developed film may show an image that is definitely out of focus. This is due in the majority of cases to the plane of the ground glass being in a different position from that of the film. A variation of a very small amount, ten thousandths of an inch with lenses of about six inches having a fair speed and only one or two thousandths with lenses of high speed and short focal length being enough to damage the definition to such an extent that upon enlargement the picture is decidedly out of focus. Consequently the obvious step to take is to measure the position of the film in relation to the camera body and adjust the ground glass screen to take up its proper position with respect to the film. This may be easily done with cameras using glass plates since the plates are quite rigid and the usual depth gage or dial indicator may be used. However, no such an instrument can be used in the case of a film due to the fact that the film is very flexible and the slightest pressure will push the film out of position. The instrument above described and illustrated in the drawing can be actuated with a very small amount of pressure such as a grain or two which will not influence the film in the slightest degree. There are only two major moving parts which are extremely light and which are mounted on jewel bearings so that there is no backlash and a positive deadbeat action.

It should be understood that the reflected beam of light 28 may be of any length and possesses no weight. A large calibrated scale can be placed upon a wall or other support and this scale will permit of extreme accuracy in connection with the measurements desired. The camera is placed on the optical bench and the instrument is inserted through the lens opening and the measurement is taken very quickly.

It should be understood that the present invention is in the nature of an instrument which is especially constructed as a measuring device for particular use on a fragile film or other delicate object where an extremely small degree of pressure is needed to actuate the mirror 19.

It will be seen that the general plan of the device is to produce a light-weight optical lever micrometer for determining the average film plane of a camera so as to adjust and position the ground glass for the best possible focus in view of the fact that set variations of the film will ordinarily upset the critical focus. The present device permits actual physical contact with the film and this contact is a very light one so as to avoid bending or distorting the film while positioning the light beam or reflecting the light beam on the scale which is hung on the wall in order to show the exact measurement or displacement of the film plane.

It should be understood that the mirror 19 may be mounted upon jewel bearings to facilitate free operation and to limit friction to a minimum. It should be further understood that the mirror 19 keeps the wire 16 in contact with the film 12 or other object and provides complete absence of lost motion in view of the fact that the two moving parts, that is to say, the mirror 19 and wire 16, are extremely light, pressure is at a minimum.

Certain detail changes in the mechanical construction may be employed without departing from the spirit of the invention, so long as such changes fall within the scope of the appended claims.

Having described the invention, what is claimed is:

1. A new article of manufacture comprising an instrument for measuring the variation of the plane of a film relative to the ground glass plate of a camera, said article comprising an elongated narrow base to facilitate the placing of said article through the lens opening of a camera, a longitudinally slidable film contact wire extending longitudinally of one end of said base and carried close to said base, a light-reflecting mirror hinged above and close to said base, one end of said wire loosely contacting said mirror beyond its hinge and the other end of said wire adapted to contact the film loosely, the film extending at right angles to the longitudinal axis of said base, an elongated safety guard extending in close proximity to the film and receiving said wire to reinforce the wire and to hold the outer end of the wire in straight alignment throughout its length, a source of light lying close upon said support and spaced from said mirror for casting a beam of light upon said mirror, a calibrated scale asociated with the article and located to receive a light ray cast upon said reflecting mirror from said source of light for measuring the exact displacement of the film plane relative to the ground glass plate of a camera, and means for retracting said film contact wire away from the film.

2. A new article of manufacture comprising an instrument for measuring the variation of the plane of a film relative to the ground glass plate of a camera, said article comprising an elongated narrow base to facilitate the placing of said article through the lens opening of a camera, a longitudinally slidable film contact wire extending longitudinally of one end of said base and carried close to said base, a light-reflecting mirror hinged above and close to said base, one end of said wire loosely contacting said mirror beyond its hinge and the other end of said wire adapted to contact the film loosely, the film extending at right angles to the longitudinal axis of said base, a source of light lying close upon said support and spaced from said mirror for casting a beam of light upon said mirror, a calibrated scale associated with the article and located to receive a light ray cast upon said reflecting mirror from said source of light for measuring the exact displacement of the film plane relative to the ground glass plate of a camera, a rigid depending finger carried by said wire, a retraction element movable longitudinally of said support, a laterally bent finger carried by the retraction element normally out of contact with said rigid depending finger and adapted to engage said rigid depending finger of said wire to retract said wire from said film as said retraction element is moved in one direction, and manually operated means for moving said retraction element longitudinally of said support.

JOHN L. WESTHAVER.

REFERENCES CITED

The following references are of record in the file of this patent:

UNITED STATES PATENTS

| Number | Name | Date |
|---|---|---|
| 438,300 | Edison | Oct. 14, 1890 |
| 1,184,399 | Wheeler | May 23, 1916 |
| 1,337,018 | Lockey et al. | Apr. 13, 1920 |
| 1,863,673 | Schraven | June 21, 1932 |
| 1,889,719 | Wende | Nov. 29, 1932 |
| 2,224,281 | Webber | Dec. 10, 1940 |
| 2,366,645 | Ollendorf | Jan. 2, 1945 |

FOREIGN PATENTS

| Number | Country | Date |
|---|---|---|
| 165,935 | Great Britain | July 1, 1921 |
| 238,600 | Great Britain | Aug. 19, 1925 |
| 684,213 | France | Mar. 17, 1930 |
| 389,541 | Great Britain | Mar. 23, 1933 |